DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 22, 1971

887 O.G. 1047

T887,028
MULTIPIECE GARMENT
Oliver N. Seelig, 26 Hawthorne Road, Wyomissing Hills, Pa. 19069
Continuation of application Ser. No. 808,053, Feb. 18, 1969, which is a continuation-in-part of application Ser. No. 647,510, June 20, 1967. This application Aug. 7, 1970, Ser. No. 62,168
Int. Cl. A41b *11/00*
U.S. Cl. 2—240
2 Sheets Drawing. 18 Pages Specification

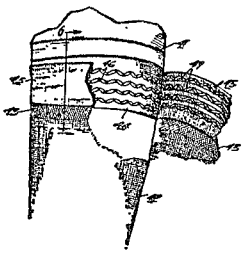

Figure 1:
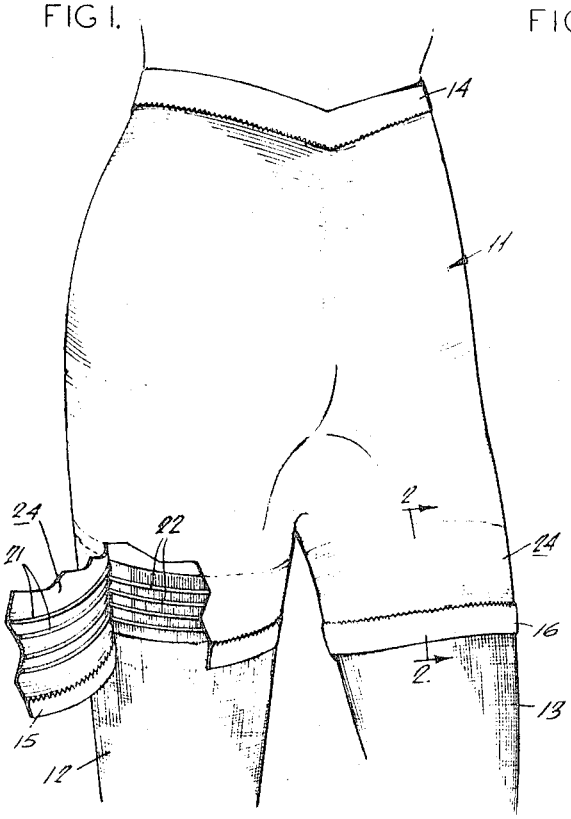
Figure 2:
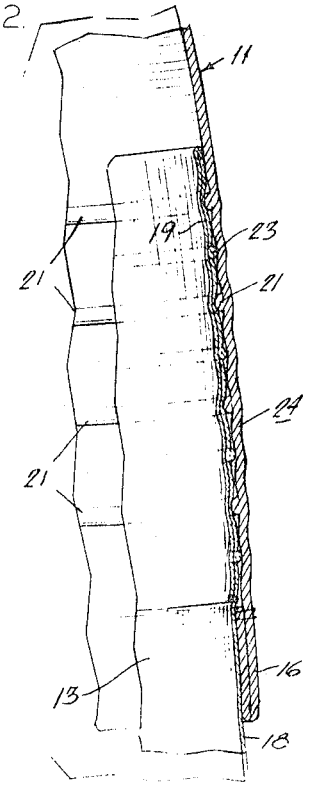
Figure 3:
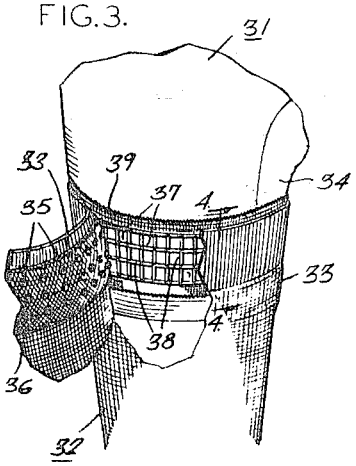
Figure 4:
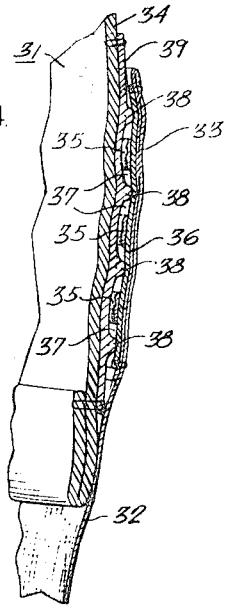
Figure 5:
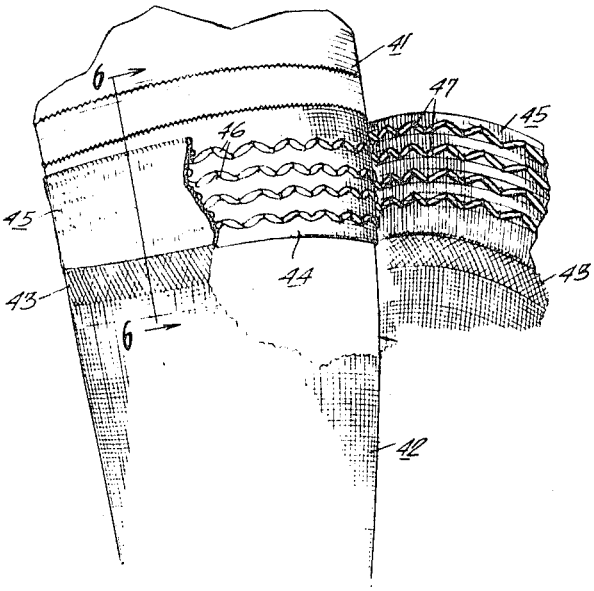
Figure 6:
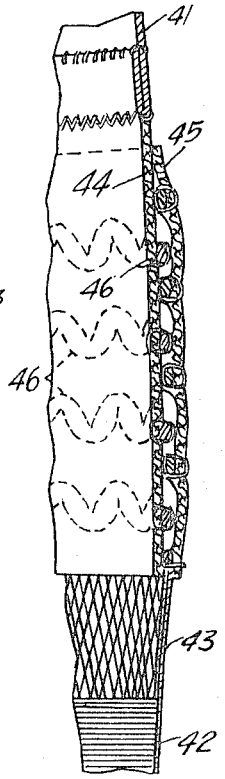
Figure 7:
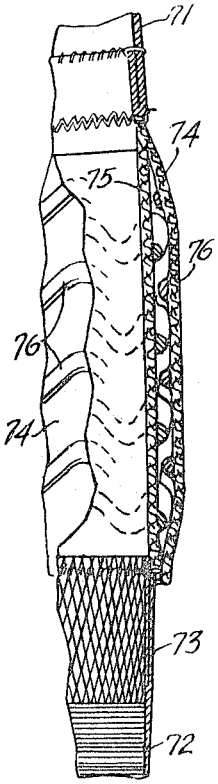
Figure 8:
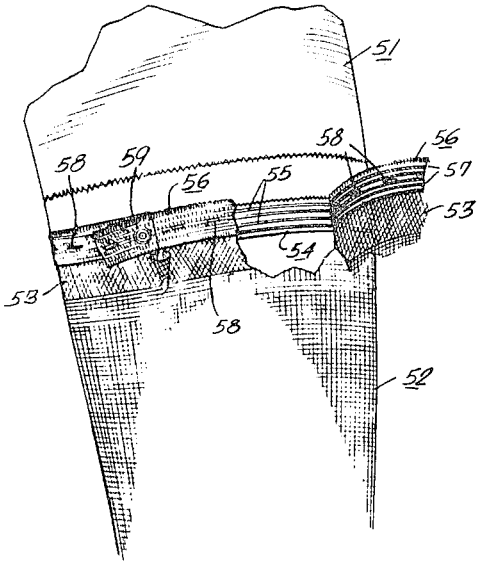
Figure 9:
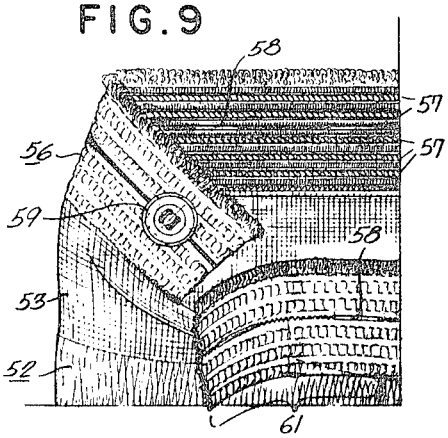

Multipiece garments in which the separate pieces of the garment are retained in engagement with one another by means of complementary fastening elements secured respectively to the inside and outside of the body openings of the pieces at their juncture so that when the pieces are overlapped on the body, the complementary fastening elements interengage to inhibit inadvertent separation of the two pieces of the garment. In the preferred forms, the elements comprise elastomeric projections disposed in straight-line runs, zigzag runs (FIG. 5), and dots cooperating with lattices. In particular (see FIG. 5), a separable panty hose formed of a girdle portion 41 and stocking portions 42 is provided with complementary leg-encircling bands 45 at the top of the stockings and on the leg of the girdle having projections 46 and 47 which interengage to unite the stockings and the girdle into a substantially unitary garment in the nature of a panty tight.

June 22, 1971 O. N. SEELIG T887,028

MULTIPIECE GARMENTS

Original Filed Feb. 18, 1969 2 Sheets-Sheet 1

INVENTOR

OLIVER N. SEELIG

BY Howson & Howson

ATTORNEY

MULTIPIECE GARMENTS

Original Filed Feb. 18, 1969 2 Sheets-Sheet 2

INVENTOR

OLIVER N. SEELIG

BY Howson & Howson

ATTORNEY